United States Patent
Kiel et al.

(10) Patent No.: US 9,676,378 B2
(45) Date of Patent: Jun. 13, 2017

(54) VALVE DEVICE ADAPTABLE FOR BRAKE CONTROL OF A VARIETY OF PRESSURE MEDIUM-OPERATED VEHICLE BRAKE SYSTEMS

(75) Inventors: Bernd-Joachim Kiel, Wunstorf (DE); Hartmut Rosendahl, Hannover (DE); Gerd Roters, Wunstorf (DE); Wolfgang Strache, Hemmingen (DE); Otmar Struwe, Hannover (DE)

(73) Assignee: WABCO GMBH, Hannover (DE)

( * ) Notice: Subject to any disclaimer, the term of this patent is extended or adjusted under 35 U.S.C. 154(b) by 191 days.

(21) Appl. No.: 13/881,489

(22) PCT Filed: Oct. 8, 2011

(86) PCT No.: PCT/EP2011/005038
§ 371 (c)(1),
(2), (4) Date: Apr. 25, 2013

(87) PCT Pub. No.: WO2012/059163
PCT Pub. Date: May 10, 2012

(65) Prior Publication Data
US 2013/0214588 A1    Aug. 22, 2013

(30) Foreign Application Priority Data
Nov. 5, 2010  (DE) .......................... 10 2010 050 580

(51) Int. Cl.
*B60T 8/36* (2006.01)
*B60T 13/68* (2006.01)
(Continued)

(52) U.S. Cl.
CPC ............ *B60T 13/68* (2013.01); *B60T 13/683* (2013.01); *B60T 15/00* (2013.01); *B60T 17/04* (2013.01);
(Continued)

(58) Field of Classification Search
CPC ................................ B60T 8/368; B60T 8/3675
(Continued)

(56) References Cited

U.S. PATENT DOCUMENTS 3,945,687 A * 3/1976 Abolins et al. ................ 303/127
4,245,815 A * 1/1981 Willis ................. F16K 31/0658
137/903

(Continued)

FOREIGN PATENT DOCUMENTS

DE    10 2004 051 309 A1    5/2006
DE    10 2008 048 562 A1    4/2010
(Continued)

OTHER PUBLICATIONS

Machine Translation of DE 10 2008 048 207 (no date).*

*Primary Examiner* — Nicholas J Lane
(74) *Attorney, Agent, or Firm* — Leydig, Voit & Mayer, Ltd.

(57) ABSTRACT

A valve device for brake control of a different pressure medium-operated vehicle brake systems comprises a housing that has pressure medium ducts. A relay valve provides a pneumatic control pressure, which is fed to the relay valve via at least one of the pressure medium ducts at a higher flow rate. At least one insert is pneumatically connected to at least two of the pressure medium ducts, which can be pneumatically connected to each other by the insert. The two pressure medium ducts define a pressure medium path, the profile of which differs based on the housing that is in each case selected and/or switched based on the selected insert. The housing is selected from a set of housings having different pressure medium ducts, in particular bores, but which are otherwise essentially similar. The insert is selected from a set of different inserts.

20 Claims, 7 Drawing Sheets

(51) Int. Cl.
 *B60T 15/00* (2006.01)
 *B60T 17/04* (2006.01)
 *F16K 31/02* (2006.01)

(52) U.S. Cl.
 CPC ....... *F16K 31/02* (2013.01); *Y10T 137/86574* (2015.04)

(58) Field of Classification Search
 USPC ..... 303/DIG. 10, 119.2, 119.3, 118.1, 115.1, 303/115.2; 137/884, 269, 271
 See application file for complete search history.

(56) References Cited

U.S. PATENT DOCUMENTS

| | | | |
|---|---|---|---|
| 6,035,250 A * | 3/2000 | Newton et al. | 701/70 |
| 6,453,936 B1 * | 9/2002 | Frank et al. | 137/315.03 |
| 6,659,129 B1 * | 12/2003 | Kiel | B60T 8/361 137/596.16 |
| 6,817,247 B1 * | 11/2004 | Hilberer | B60T 8/3675 73/714 |
| 7,849,880 B2 | 12/2010 | Herges | |
| 8,844,573 B2 * | 9/2014 | Mann et al. | 137/884 |
| 8,869,831 B2 * | 10/2014 | Haehn et al. | 137/596.16 |
| 2001/0003289 A1 * | 6/2001 | Mead et al. | 137/884 |
| 2003/0020329 A1 * | 1/2003 | Herbst et al. | 303/119.2 |
| 2004/0141853 A1 * | 7/2004 | Duchet et al. | 417/282 |
| 2006/0284480 A1 * | 12/2006 | Rudolph et al. | 303/127 |
| 2007/0270006 A1 * | 11/2007 | Herges | 439/174 |
| 2009/0309413 A1 * | 12/2009 | Bensch et al. | 303/20 |
| 2010/0072810 A1 * | 3/2010 | Bensch et al. | 303/17 |
| 2011/0209787 A1 | 9/2011 | Mann et al. | |
| 2011/0273004 A1 * | 11/2011 | Mann et al. | 303/2 |
| 2013/0221735 A1 * | 8/2013 | Kiel et al. | 303/15 |

FOREIGN PATENT DOCUMENTS

| | | | |
|---|---|---|---|
| DE | 10 2008 048 207 A1 | 6/2010 | |
| DE | 102008048207 A1 * | 6/2010 | ............... B60T 7/20 |
| EP | 1 733 943 A1 | 12/2006 | |
| WO | WO 2008/025401 A1 | 3/2008 | |
| WO | WO 2009/019022 A2 | 2/2009 | |

* cited by examiner

VALVE DEVICE ADAPTABLE FOR BRAKE CONTROL OF A VARIETY OF PRESSURE MEDIUM-OPERATED VEHICLE BRAKE SYSTEMS

FIELD OF THE INVENTION

The present invention generally relates to a valve device for brake control of a pressure-medium-operated brake system of a vehicle.

BACKGROUND OF THE INVENTION

Pressure-medium-operated brake systems are used in particular for utility vehicles. Here, compressed air is preferably used as the pressure medium. For the actuation of a service brake of the vehicle or for the release of a parking brake of the vehicle, a control pressure is modulated by electropneumatic and/or pneumatic means and is provided at a boosted air flow rate, or at a higher pressure medium flow rate, by means of a relay valve. Here, the relay valve is part of the valve device and is preferably arranged in a housing of the valve device.

From the relay valve, the pressure medium with boosted pressure medium flow rate is conducted to at least one brake cylinder in order to brake at least one wheel of the vehicle or is conducted to a spring store part of a combined spring brake cylinder in order to release a parking brake at at least one wheel of the vehicle.

Various valve devices are known for different brake systems. In particular, a valve device is known to which the control pressure is supplied externally at an inlet. The control pressure is in this case modulated purely pneumatically by means of a foot-operated brake pedal.

Another known valve device uses such a brake pressure modulated by means of a foot-operated brake pedal as a redundancy pressure, and conducts the redundancy pressure to the relay valve as a control pressure in the event of an electronics failure. The known valve device furthermore has a plurality of electromagnetic valves by means of which the control pressure is modulated during normal operation.

The known valve devices, which are configured differently depending on the brake system used, may have different valves and different housings with different pressure medium ducts. In particular, the known valve devices are designed differently as a relay modulator for an electropneumatic parking brake, as a relay modulator for an electronically regulated brake system, as a relay modulator for a pneumatic brake system with anti-lock function and/or traction control, as an electromagnetic relay valve or as a relay valve. Of these different configurations, in each case different variants for different applications and/or functions are also known.

For the known valve devices, it is necessary for brackets intended specifically for the respective valve device to be provided on the vehicle. This makes it complex and expensive to equip vehicles with different brake systems. Furthermore, it is necessary to produce a multiplicity of different housings, which leads to low unit quantities and consequently high costs of production of the known valve devices.

DE 10 2008 048 562 A1 discloses a valve arrangement, without relay valve, having a plurality of valve devices for brake control of a pneumatic brake system of a vehicle, in particular a rail vehicle. The valve devices of the valve arrangement are formed as block-like support modules with identical height and depth dimensions. The valve devices are connected to one another and have bores which, together, form longitudinal ducts extending through the valve device. Furthermore, the valve devices have a standard bore for receiving in each case one cartridge valve. Different control valves for different valve functions are provided as cartridge valves. For adaptation to the different valve functions, a duct guide in the valve device is adapted by inserting plug elements into pressure medium ducts to be shut off. In the known valve devices, it is necessary, in a cumbersome manner, for plug elements to be positioned precisely and such that they remain permanently in position. An intended mode of operation of the respective valve device, such as is desired or necessary in the case of the abovementioned valve devices for utility vehicles, would otherwise be impaired. It would therefore appear to be disadvantageous for an air guide or pressure medium guide which can be varied by means of plug elements to be provided in the case of the abovementioned valve devices with relay valve.

SUMMARY OF THE INVENTION

Generally speaking, it is an object of the present invention to provide an improved valve device with relay valve for brake control of the vehicle brake system—e.g., for braking or immobilizing the vehicle by means of pressure-medium-operated brake cylinders, and a brake system having the valve device and also a vehicle having the valve device.

The valve device according to the invention is provided for brake control of a pressure-medium operated brake system of a vehicle. The valve device has a housing, which in turn has a plurality of pressure medium ducts. The pressure medium ducts are in particular bores in the housing. In the pressure medium ducts there is situated a pressure medium, preferably air, which can be conducted through the pressure medium ducts. In devices that are pneumatically connected to the same pressure medium duct, an identical pressure is assumed at least after a finite period of time. The pressure medium ducts thus serve for pressure transmission, ventilation and/or aeration. The valve device furthermore has a relay valve that provides a pneumatic control pressure, which is supplied to the relay valve through at least one of the pressure medium ducts, at a higher pressure medium flow rate.

Furthermore, the valve device has at least one insert, for example a valve block, which is pneumatically connected to two or more of the pressure medium ducts. The pressure medium can thus flow from a pressure medium duct through the insert to a second pressure medium duct, such that the two pressure medium ducts are or can be pneumatically connected to one another through the insert or through the valve block. Here, two pressure medium ducts are considered to be pneumatically connected to one another if the same pressure is assumed in the two pressure medium ducts after a finite time.

The arrangement of the two pressure medium ducts, which are or can be connected to one another, including the pneumatic connection of the two pressure medium ducts through the insert, is referred to in the present description as the pressure medium path. Here, the pressure medium path may if appropriate have further pressure medium ducts, or other pressure medium devices, pneumatically connected to at least one of the two pressure medium ducts. At least the two pressure medium ducts that are or can be connected to one another, and the pneumatic connection or connection facility thereof through the insert, thus together define the pressure medium path. The valve device may have one or more of such pressure medium paths.

Two housings of an identical housing type, in which at least one of the two pressure medium ducts is arranged differently in relation to the corresponding pressure medium duct of the other housing, thus have different pressure medium paths, for example. Different pressure medium paths may also be provided if the insert or the valve block for example pneumatically connects a first to a second pressure medium duct in a first valve device but pneumatically connects the first to a third pressure medium duct in a second valve device. The third or second pressure medium duct that does not belong to the pressure medium path in the respective case may in each case be omitted, have a different function or be unused.

The inventive valve device has, in relation to other valve devices with a different function, a housing of an identical housing type or an identical or substantially identical housing, which can thus be produced inexpensively in large unit quantities for all of the valve devices. In particular, the same casting mold or a substantially identical casting mold may be used for casting the housing. Pressure medium ducts, in particular drilled holes, which are formed into the respective housing after the casting process may likewise be substantially identical or may differ by the different valve devices. Here, housings with different pressure medium ducts and/or with different housing covers are regarded as being substantially identical if they are otherwise identical or differ only insignificantly. In particular, housings of the same housing type are considered to be substantially identical regardless of their drilled holes and regardless of the configuration of the housing cover.

The object of the invention is furthermore achieved in that, for a respectively desired function of the respective valve device, either a housing with pressure medium ducts specifically for the function is provided, wherein the insert may be one that is substantially identical or different in relation to the valve devices with identical housing but different function. Alternatively, the housing has a plurality of pressure medium ducts for different functions, which pressure medium ducts are used depending on the desired function, wherein the respectively selected insert determines which pressure medium ducts are actually used and how the pressure medium ducts are used.

In detail, therefore, on the basis of a respectively selected housing selected from a set of a plurality of housings that have different pressure medium ducts, in particular bores, but which are otherwise identical or substantially identical, the pressure medium path runs differently depending on the respectively selected housing.

Alternatively or in addition, on the basis of a respectively selected insert selected from a set of a plurality of different inserts, the pressure medium path is or can be connected differently depending on the respectively selected insert.

In particular, the pressure medium path has different pressure medium ducts for different inserts. In one particular embodiment, the pressure medium path has the pressure medium duct that conducts the control pressure.

It will be appreciated that the present invention provides a valve device that can be used for a multiplicity of different brake systems. Here, the valve device has a high number of standardized components. With comprehensive standardization, therefore, it is necessary merely for different pressure medium ducts or bores to be formed into the housing and/or for different inserts to be used in order to use the valve device in different brake systems. If appropriate, the housings are provided with different covers. It is however alternatively also possible for identical or substantially identical covers to be used that have identical or different bores.

It is preferable for at least one of the pressure medium ducts, in particular in the case of the selected insert, to be assigned in each case one function from the group "aeration", "ventilation", "conduct control pressure or redundancy pressure", "conduct brake pressure", and "not used". Here, the respective pressure medium duct is preferably assigned a different function from the group in each case in relation to a selection of a different insert from the set of inserts owing to the design of the actually selected insert, which is different from the design of the other insert. Identical pressure medium ducts or bores may be assigned different functions by means of the insert. In particular, the pressure medium duct that conducts the control pressure may thus for example either be charged with pneumatically modulated pressure through the insert or aerated with compressed air from a compressed-air reservoir or ventilated to a vent device.

The pressure medium path preferably comprises at least one pressure medium duct that is an internal duct. An internal duct is a pressure medium duct that pneumatically connects port connections to the insert and/or further pressure medium ducts of the valve device to one another. Here, the pressure medium path comprises at least a different internal duct in the case of the selected housing in relation to the selection of a different housing from the set of housings and/or in the case of the selected insert in relation to the selection of a different insert from the set of inserts.

A pressure medium duct used with one insert is thus not provided in the respective other insert or is not used with the respective other insert. Depending on the selection of the insert, it is for example possible for a first pressure medium duct to be pneumatically connected, or made pneumatically connectable, either to a second or to a third pressure medium duct. The pressure medium is thus conducted via different pressure medium ducts in the housing of the valve device for different configurations of the valve device. Pressure medium ducts that are not required may be omitted or may alternatively nevertheless be provided in the valve device. It may however also be the case that pressure medium ducts are used differently in some configurations of the valve device or for use in some brake systems. For example, the same pressure medium duct may conduct the control pressure in the case of the selected insert, whereas the pressure medium duct conducts for example the reservoir air pressure to the vent in the case of a different insert. The housing may thus have identical pressure medium ducts, in particular in the form of identical drilled holes, for each insert or for a group of inserts.

In a further embodiment of the invention, the pressure medium ducts alternatively or additionally comprise a plurality of port ducts that lead to ports on the housing. Here, the pressure medium path comprises at least two of the port ducts, wherein the pressure medium path comprises at least one different port duct, or the function of at least two port ducts comprised by the pressure medium path are interchanged with one another, in the case of the selected housing in relation to the selection of a different housing from the set of housings and/or in the case of the selected insert in relation to the selection of a different insert from the set of inserts. It may thus be provided, for example, that a pressure medium duct that serves for aeration with a reservoir air pressure serves, in a different insert, to provide the brake pressure with boosted air flow rate from the relay valve to the connection to the brake cylinder, and/or vice versa.

The housing preferably comprises a housing block and a housing cover. The relay valve is advantageously arranged in the housing block. The housing block advantageously also comprises at least two port ducts. Pressure medium lines or pressure medium pipes for connecting to further pneumatic components of the brake system can be connected to the ports.

The housing block is advantageously of identical or at least substantially identical design independently of the selection of the housing in relation to the selection of preferably any other housing from the set of housings and/or independently of the selected insert in relation to the selection of preferably any other insert from the set of inserts. Here, two housing blocks are considered to be identical if they have identical or different pressure medium ducts but otherwise no significant differences, in particular originate from the same or an identical casting mold. In particular, the housing block has identical mechanical fastening points in the case of each of the housings and/or in the case of each of the inserts. It is thus possible for the valve device to be fastened to brackets on the vehicle in the same way independently of the selection of the insert and/or independently of the selected brake system.

Alternatively or in addition, the ports on the housing or pneumatic interfaces on the housing are formed in the same way, and in an advantageous refinement also arranged in the same way, independently of the selected housing from the set of housings and/or independently of the selected insert. Ideally, an identical or substantially identical housing block is provided for the valve devices having identical or differently selected inserts. It is however also alternatively possible, for example, for two different housing blocks to be provided for two groups of valve devices. For example, an identical housing block may be provided for different valve devices formed as modulators with electromagnetic valves, and a different housing block may be provided for different valve devices formed as relay valves.

The housing covers may be of either identical or different design for the valve devices with different housings and/or with different inserts. It may for example be advantageous, despite resulting lower unit quantities in which identical housing covers must be produced, to produce a plurality of different housing covers, because for example the production of a cover for a valve device formed as a relay valve may be less expensive, owing to simpler technical configuration, than the production of additional covers that can also be used for a valve device formed as a modulator.

The insert is preferably surrounded by the housing block and by the housing cover and clamped to the housing. In this way, it is possible, for example, for the cover to be screwed to the housing block so as to surround the insert, such that when the housing cover is screwed on, pneumatic connections are simultaneously produced between the housing and the insert, and the insert is fixedly fastened to the housing. An exchange of the insert, for example for the repair of the valve device in the event of a defect in the insert, can thus be performed easily by simply unscrewing the cover, exchanging the insert and subsequently screwing the cover onto the housing block again. The cover is a replacement part that can be repaired in a workshop.

A conversion of the valve device for a different brake system is also easily possible in this way, by merely exchanging the insert for a different insert from the set of inserts. If appropriate, it is additionally necessary for port lines to be connected to different ports on the housing. An exchange of the complete valve device is however not necessary. When the insert is exchanged, the housing cover must additionally be exchanged if appropriate. Two housings that have housing blocks of identical design but housing covers of different design are considered to be of substantially identical design. In particular, the housing block preferably makes up a significant proportion of the housing, or makes up a greater proportion of the housing than the housing cover.

In a preferred embodiment of the invention, the insert is a valve cartridge or a valve block. Here, the insert has at least one valve. In particular, the valve cartridge has one valve, whereas the valve block preferably has a plurality of valves, for example three valves. The valves are preferably electromagnetic valves. The pressure medium path can be opened up or blocked by means of the valve.

Alternatively or in addition, there may be provided in the valve device an insert that is a valve replacement body or connecting body that has at least one connecting duct and that connects pressure medium ducts permanently to one another. The insert is in this case a type of distributor station by means of which for example pressure medium ducts that lead to ports on the housing and pressure medium ducts that lead to valves are pneumatically connected to one another depending on the desired function and/or the valve that is used, such that ports on the housing may have identical functionality despite internally differently used pressure medium ducts, or may be used with identical pressure medium lines, for example to the compressed-air reservoir or to the brake cylinder.

If appropriate, a valve replacement body of this type may be provided in a valve block instead of a valve and thus, as a dummy body, fill out a chamber provided for receiving a valve and simultaneously perform connecting functions for the permanent connection of pressure medium ducts.

In one embodiment, the insert has a hardened injection-molded compound or cast compound or is composed of the injection-molded compound or the cast compound. The injection-molded compound or cast compound is in particular a plastic injection-molded compound or plastic cast compound. Here, the injection-molded compound or cast compound at least partially surrounds the insert or the valve. Different components of the valve can be inexpensively and permanently connected to one another and fixed relative to one another in this way. A valve replacement body or connecting body that may be provided may also have such an injection-molded compound or cast compound or a different injection-molded compound or cast compound. It is for example possible for cavities in a magnetic valve block, which cavities are provided for receiving valves, to be filled out with such an injection-molded compound or cast compound. Connecting ducts that may be required may be left free during the injection molding or casting or may be formed retroactively into the hardened injection-molded compound or cast compound. A plug connector is advantageously also already injection-molded onto the insert.

In one embodiment, the respective insert used in the valve device preferably differs from at least one other, in particular third, insert of the set of inserts in that it has at least one identical valve but has at least one different connecting duct, in particular bore, in the insert. In this way, it is duly possible for at least partially identical valves to be used in the valve block. Different functionality can however be attained by means of different pressure medium guidance or by means of different bores in the valve block. By contrast, the design of the housing block of the valve device remains identical.

In another embodiment of the invention, the insert differs from at least one other, in particular third, insert of the set of inserts in that it has two identical connecting ducts, in particular bores, in the insert or in the valve block but has at least one different valve. Here, different functionality is made possible simply through the use of different valves. If appropriate, different functionality is attained by virtue of a dummy body or valve replacement body being inserted instead of a valve, or a cavity intended for receiving a valve being filled out with a plastic and permanently forming a connecting duct.

The valve device is preferably a device from a group of devices, in particular with housings of the same housing type, wherein the group comprises a relay modulator device for an electropneumatic parking brake. The group also has a relay modulator device for an electronically regulated brake system, a relay modulator device for a pneumatic brake system with or without traction control, an electromagnetic relay valve device, and a relay valve device of simple design. The valve device is selected from the group as a function of the respective housing and/or as a function of the respective insert. In particular, the selected housing and/or the selected insert determines which device from the group the valve device can be used as. Two different valve devices from the group therefore differ merely by different housings, in particular by different pressure medium guidance in the housing of the same housing type, and/or by different inserts, in particular valve blocks. The group of devices may if appropriate have fewer devices than those mentioned. The group however comprises at least two of the devices, such that the valve device is one of the at least two devices depending on the selected housing and/or depending on the selected insert. The group however preferably comprises at least three, very preferably at least four, of the stated devices.

The housing preferably has ports for connecting to a compressed-air reservoir, to a vent, to a control pressure or redundancy pressure and to at least one brake cylinder. The ports are connected to the port ducts, such that the compressed air that is preferably used as the pressure medium can be conducted to the ports and drawn via the ports.

The housing of the valve device preferably is formed predominantly from a light metal. It is particularly preferable for the housing to comprise aluminum, or to be an aluminum pressure die cast body. The pressure medium ducts are preferably formed at least partially by bores in the housing.

Still other objects and advantages of the present invention will in part be obvious and will in part be apparent from the specification.

The present invention accordingly embodies the features of construction, combinations of elements, and arrangement of parts, all as exemplified in the detailed disclosure hereinafter set forth, and the scope of the invention will be indicated in the claims.

BRIEF DESCRIPTION OF THE DRAWINGS

Further embodiments will emerge from the claims and from the exemplary embodiments, which are explained in more detail on the basis of the appended drawings, in which:

DETAILED DESCRIPTION OF THE PREFERRED EMBODIMENTS

Figure 1:
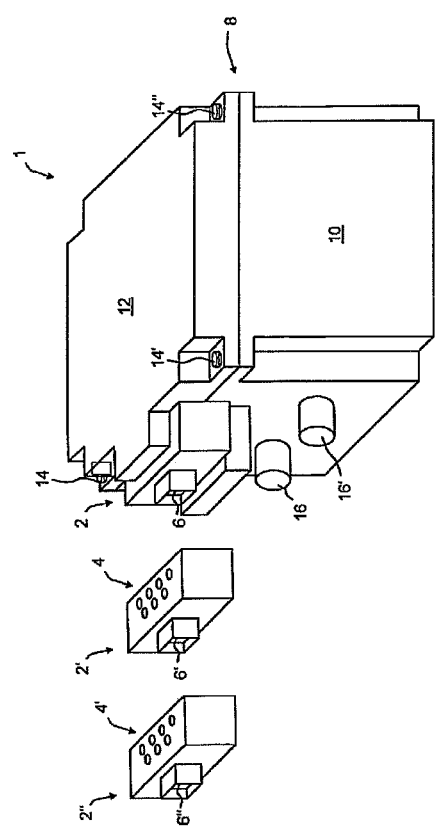
FIG. 1 shows a valve device according to a first exemplary embodiment of the invention, together with two valve blocks that can be inserted alternatively to an inserted valve block.

FIG. 1 shows a valve device 1 for a compressed-air-operated brake system of a utility vehicle. Brakes of the vehicle can be actuated by means of the valve device 1. The valve device 1 has an insert 2 formed as a valve block. Owing to the selected insert 2, the valve device 1 is a relay modulator device for an electronically regulated brake system. With alternatively selectable inserts 2' and 2", which are likewise formed as valve blocks, the valve device 1 would, by contrast, be a relay modulator device for a pneumatic brake system or a relay modulator device for an electropneumatic parking brake. Here, the inserts 2, 2' and 2" are externally of identical design, or are of identical external appearance, but have different air guides and/or different valves in the interior. Internal pneumatic ports 4 of the insert 2' are however identical to internal pneumatic ports 4' of the insert 2" and to internal pneumatic ports (not shown) of the insert 2. Furthermore, the inserts 2, 2' and 2" have identical electrical terminals or interfaces 6, 6' and 6". Identical electrical terminals 6, 6' and 6" means mechanically identical or compatible plug connector shrouds or plug connector shanks that can be placed in contact with identical or compatible plug connectors or couplings, wherein different electrical contacts and/or a different number of electrical contacts may however be produced if appropriate. In particular, pin assignments of the electrical terminals 6, 6' and 6" may differ from one another. For example, for a different number of valves to be electrically actuated, a different number of electrical contacts is required, which electrical contacts are realized in accordance with the demands in the electrical terminals 6, 6' and 6" or in the plug connectors.

The insert 2 is fastened to a housing 8 of the valve device 1. The housing 8 includes a housing block 10 and a housing cover 12, which is fastened to the housing block 10 for example by means of screws 14, 14', 14" and a further screw which is obscured. The insert or valve block 2 is clamped between the housing block 10 and the housing cover 12. Here, pneumatic connections to corresponding internal pneumatic ports on the housing block 10 and/or on the housing cover 12 are produced via the internal pneumatic ports of the insert 2.

The valve device 1 is, owing to the housing 8, too, a relay modulator device for an electronically regulated brake system. A different function of the valve device 1 may be attained by means of an alternatively selectable insert 2 and/or by means of an alternatively selectable housing 8.

The housing block 10 has pneumatic ports 16 and 16' and, if appropriate, further pneumatic ports that are pneumatically connected to port ducts in the housing block 10.

Figure 2:
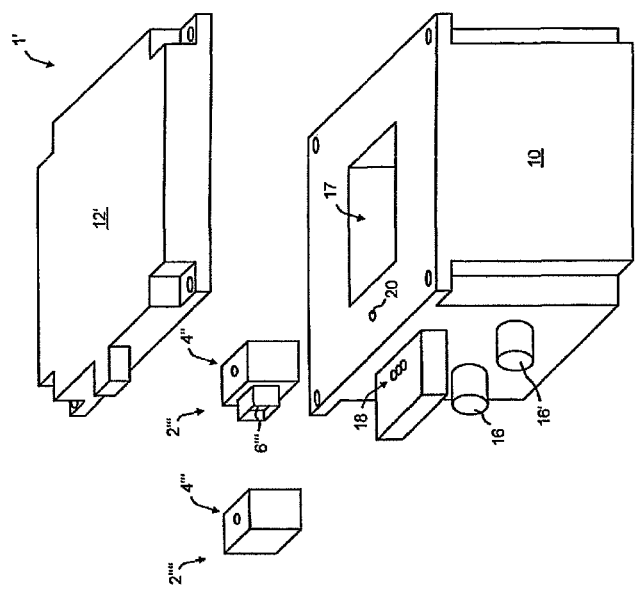
FIG. 2 is an exploded view showing a housing block, a valve cartridge and a housing cover of a valve device according to a second exemplary embodiment of the invention, together with a further valve cartridge.

FIG. 2 is an exploded view of a valve device 1', which is in the form of an electromagnetic relay valve device. Here, the difference between the valve device 1' and the valve device 1 of FIG. 1 emerges substantially from the selection of an insert 2''', which differs from the insert 2. The valve device 1' otherwise has a housing substantially identical to the housing 8 of the valve device 1. In particular, the valve device 1' also has the housing block 10 with identical pressure medium ducts. It would however alternatively also be possible for fewer, more and/or different pressure medium ducts to be provided in the housing block 10, with the function of the valve device 1' being dependent on the pressure medium ducts.

Instead of the housing cover 12, there is provided in the valve device 1' a housing cover 12', which is of simplified form in relation to the housing cover 12, in particular because the insert 2''' is also of simplified form in relation to the inserts 2, 2' and 2'' of FIG. 1 and, in the exemplary embodiment shown, has only one internal pneumatic port to the housing cover 12' and three further pneumatic ports to the housing block 10. An electrical terminal 6' is also provided. By contrast, in the case of an alternatively selectable insert 2'', which is likewise in the form of a valve cartridge and which can be inserted instead of the insert 2''' between the housing block 10 and the housing cover 12', an electrical terminal is not required. With the insert 2'', the valve device 1 is a purely pneumatic relay valve device.

A relay valve 17 is arranged substantially in the housing block 10. The housing block 10 also has internal pneumatic interfaces 18 for connecting to the insert 2''' or to a different insert. A pneumatic connection between the housing block 10 and the housing cover 12' is realized by means of a pneumatic interface 20. Here, pneumatic connections via pneumatic interfaces or ports may be produced by means of correspondingly arranged drilled holes, and sealing may be realized by a seal, for example an O ring, arranged in the transition region.

Figure 3:
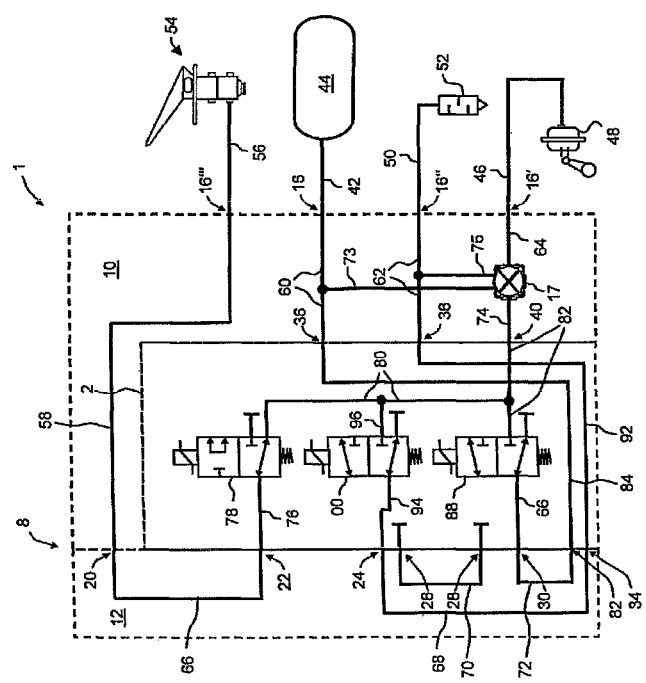
FIG. 3 is a circuit diagram of the valve device depicted in FIG. 1.
Figure 5:
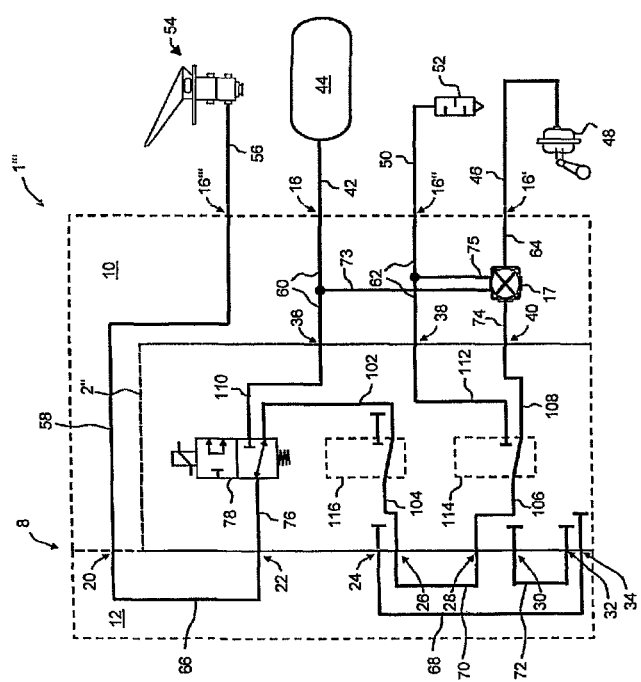
FIG. 5 shows a valve device according to a fourth exemplary embodiment, having a different valve block than those depicted in FIGS. 1 and 4.
Figure 6:
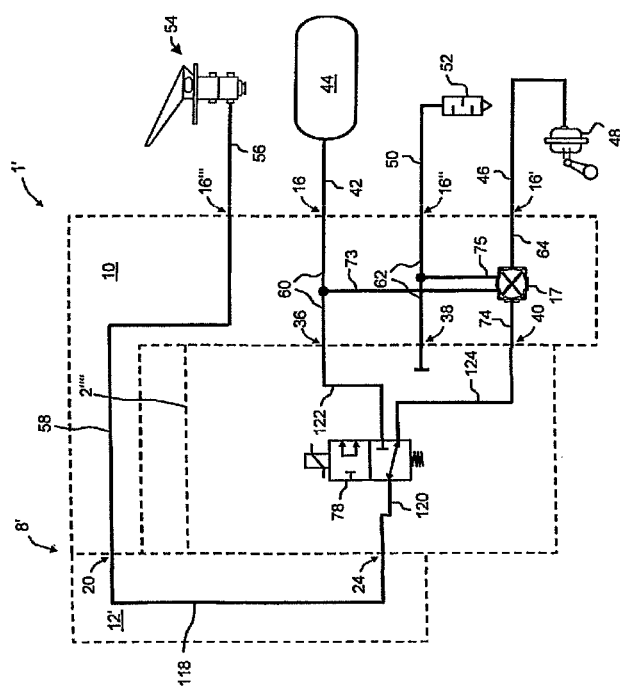
FIG. 6 is a circuit diagram of the valve device according to the second exemplary embodiment depicted in FIG. 2.

FIGS. 3, 5 and 6 are exemplary circuit diagrams of the valve device 1 of FIG. 1 with the insert 2, of a valve device 1'' with the insert 2' of FIG. 1, and of a valve device 1' with the insert 2'' of FIG. 1, in each case in conjunction with further components of a brake system. Despite the reference to the valve device 1, the following description also refers to the valve devices 1'' and 1''', because these all have substantially identical housings 8 and 8'.

In particular, the housing 8 has the housing block 10 and the housing cover 12. The insert 2 is arranged between the housing block 10 and the housing cover 12 and has internal pneumatic interfaces 22, 24, 26, 28, 30, 32 and 34 to the housing cover 12 and further internal pneumatic interfaces 36, 38 and 40 to the housing block 10. The valve device 1 is connected via the pneumatic port 16 and a compressed-air line 42 to a compressed-air reservoir vessel 44 and can thus be supplied with compressed air from a compressed-air reservoir. The valve device 1 is furthermore connected via the pneumatic port 16' and via a compressed-air line 46 to at least one brake cylinder 48, such that a vehicle can be braked by means of the brake cylinder 48.

Via a further pneumatic port 16'' and a compressed-air line 50, the valve device 1 can be ventilated to a vent 52. If appropriate, the vent 52 may also be integrated directly into the valve device 1 or flange-mounted on the valve device 1. Finally, a further pneumatic port 16' is provided on the housing 8 of the valve device 1 for connecting to a brake pedal device 54 via a compressed-air line 56.

The housing 8 preferably has pressure medium ducts realized as bores. As regards the pressure medium ducts, a distinction will hereinafter be made between port ducts and internal ducts. Port ducts 58, 60, 62 and 64 are pressure medium ducts that lead to the pneumatic ports 16 to 16''' on the housing 8. Further pressure medium ducts are internal ducts 66, 68, 70 and 72, which, in this case, are arranged in the housing cover 12. The valve device 1 also has, in particular in the housing block 10, further pressure medium ducts or internal ducts 73, 74 and 75.

A brake pressure is electropneumatically modulated by means of the valve block 2 and provided via the internal pneumatic interface 40 and the pressure medium duct 74 to the relay valve 17. By means of the relay valve 17, the air pressure prevailing in the pressure medium duct 74 is provided, at a higher air flow rate, via the port duct 64. For this purpose, the relay valve draws compressed air via the pressure medium duct 73 or ventilates the port duct 64 to the vent 52 via the pressure medium duct 75.

For exemplary illustration of a further possible air guidance configuration in the exemplary embodiment shown, a redundancy pressure is provided to the valve block 4 via the port duct 58 in the housing block 10, and onward via the pneumatic interface 20, via the internal duct 66 and finally via the internal pneumatic interface 22. In the event of an electronics failure or power failure, or deenergized valves, the redundancy pressure is transmitted through to the relay valve 17.

Figure 4:
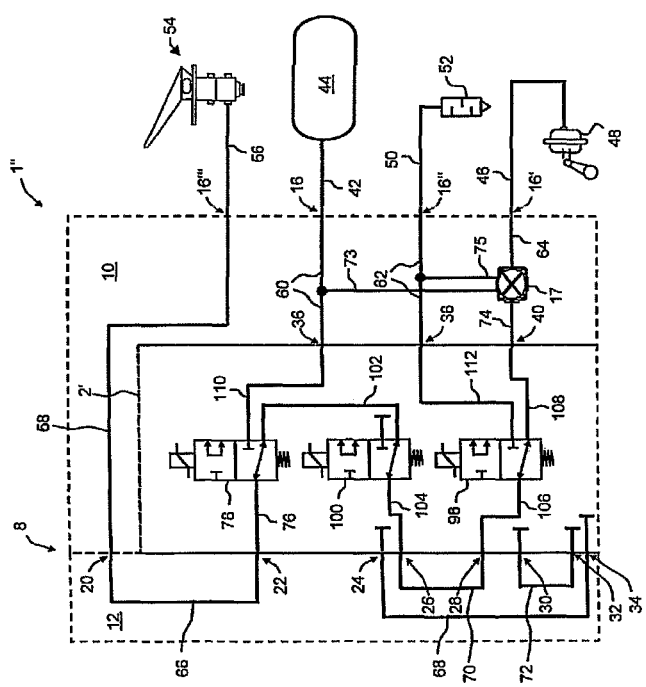
FIG. 4 is a circuit diagram of a valve device according to a third exemplary embodiment, having a different valve block than that of the inserted valve block depicted in FIG. 1.

In this respect, the valve device 1 of FIG. 3 equates to the valve device 1'' shown in FIG. 4 and to the valve device 1' shown in FIG. 5. Differences between the valve device 1 and the valve devices 1'' and 1''' emerge from the different selected inserts or valve blocks 2 and 2' or 2'' respectively. It is possible for different pressure medium paths to be connected by means of the different inserts 2 and 2' or 2'', respectively.

In the valve device 1 of FIG. 3, a pressure medium path is connected that comprises the port duct 58, the internal duct 66 and the internal duct 74. Between the internal pneumatic interfaces 22 and 24, the pressure medium path includes a connecting duct 76, an electromagnetic valve 78, a connecting duct 80 and a connecting duct 82. Further pressure medium paths are provided, for example for the electropneumatic increase of an air pressure to be modulated, through the port duct 60, a connecting duct 84, the internal duct 72, a connecting duct 86, the connecting duct 82 and the internal duct 74. To produce the pneumatic connection or the connected pressure medium path, it is necessary merely for the electromagnetic valve 88 to be energized.

A ventilation, or reduction of a modulated pressure, may take place, in the event of an energization of an electromagnetic valve 90, via a further pressure medium path that includes the port duct 62, a connecting duct 92, the internal duct 68, a connecting duct 94, the electromagnetic valve 90, a connecting duct 96, the connecting duct 80, the connecting duct 82 and the internal duct 74.

In conjunction with the valve block 2, the internal duct 70 is not used. The internal pneumatic interfaces 26 and 28 and/or ports or blind holes adjoining them may also be omitted if appropriate. In alternative exemplary embodiments, the internal duct 70, which is not required, may also be omitted. Furthermore, the existing pressure medium ducts, in particular the connecting ducts, may also be guided differently and for example also connect other pneumatic interfaces to one another or be connected to other pneumatic interfaces.

FIG. 4 shows the valve device 1'' with the insert 2', which is selected to be different to that in the valve device 1 of FIG. 3. The insert or valve block 2' has, like the valve block 2, the electromagnetic valve 78. By contrast to the valve block 2, however, the valve block 2' has electromagnetic valves 98 and 100 instead of the electromagnetic valves 88 and 90. Furthermore, the valve block 2' has an air guidance configuration that differs from that of the valve block 2. Owing to the different valve device 2, or owing to the changed air guidance configuration, the connectable or connected air paths of the valve device 1" are changed in relation to the air paths of the valve device 1. In particular, it is for example the case that an air path that conducts a setpoint brake pressure pneumatically modulated by the brake pedal device 54, as a redundancy pressure, to the relay valve 17 has not only the port duct 58, the internal duct 66, the internal duct 76, the electromagnetic valve 78 and the internal duct 74, but also a connecting duct 102, a path through the electromagnetic valve 100, a connecting duct 104, the internal line 70, a connecting duct 106, a path through the electromagnetic valve 98, and a connecting duct 108. Therefore, owing to the design of the valve block 2', the internal duct 70 is used as part of an air path; whereas, if the valve block 2 is selected, the internal duct 70 is unused, and different air paths have the internal ducts 68 and 72, respectively. Furthermore, the valve block 2' has connecting ducts 110 and 112.

The valve devices 1 and 1" differ, owing to the different selected valve blocks 2 and 2', by a different functionality, in particular in the event of an electronics failure, power failure or failure of at least one of the electromagnetic valves 78, 88, 90, 98, 100. For the different functionality, it is necessary merely to select a valve block 2 to 2"" provided for this purpose, whereas for example the housing 8 may remain the same. The housing 8 can thus be produced inexpensively in large unit quantities. The housing 8 may be one of numerous housings of an identical housing type, wherein all of the housings 8 of the housing type have substantially identical features, in particular originate from the same casting mold or an identical casting mold. The pressure medium ducts or drilled holes of the housings 8 of identical housing type may however be arranged differently, and thus be adapted to the respectively desired function of the valve device 1 that has the respective housing 8.

FIG. 5 shows the valve device 1''', which substantially equates to the valve device 1" of FIG. 4. In particular, the housing 8 is again provided in the valve device 1'''. Even the valve block 2" substantially equates to the valve block 2' of FIG. 4. In particular, an identical air guidance configuration to that in the valve block 2' is provided, in particular owing to identical bores, in the valve block 2". In the valve block 2", however, instead of the electromagnetic valves 98 and 100 of the valve block 2' of FIG. 4, dummy bodies 114 and 115 are provided that provide a permanent connection between the connecting ducts 102 and 104 and between the connecting ducts 106 and 108, respectively, and which otherwise fill out a remaining empty space. The dummy bodies 114, 116 may, after being produced, be inserted into the valve block 2" instead of electromagnetic valves 98, 100. Alternatively, the dummy bodies 114, 116 may however also be produced by virtue of cavities suitable for receiving the electromagnetic valves 98 and 90 being filled out by casting, or filled out by injection molding, with an injection-molded compound or cast compound, wherein the abovementioned connecting paths are left free for example as a result of the prior insertion of tubes.

FIG. 6 shows a circuit diagram of the valve device 1' of FIG. 2 with the simplified housing cover 12' and the cartridge valve 2"" which has the electromagnetic valve 78 but no further valves. The housing block 10 is however of identical design to the housing blocks 10 of the valve devices according to FIGS. 3, 4 and 5. In terms of its function, the valve device 1' is identical to the valve device 1' of FIG. 5. The housing cover 12' is of simpler construction than the housing cover 12, and in particular has only one internal duct 118 instead of the internal ducts 66, 68, 70 and 72. The insert or the valve cartridge 2" has pressure medium ducts 120, 122 and 124 as connections in a housing 8' of the valve device 1', and the electromagnetic valve 78. The valve cartridge 2" is thus likewise of simpler construction, and can be produced less expensively, than the valve block 2". In exceptional cases, it may therefore be expedient for individual inserts or subgroups of inserts to be formed differently at least externally, whereas in general, a plurality of inserts of the group of inserts are preferably of identical external design, in particular in terms of their dimensions. It may likewise be advantageous in individual cases for housing covers 12' of different form to be provided instead of the housing cover 12, wherein, however, the housing 8' substantially equates overall to the housing 8, for example because an identical housing block 10 is used. On the housing block 10 there are preferably provided mechanical interfaces for fastening to a vehicle frame. It is thus possible, independently of the selection of the respective insert 2, 2', 2" or 2"', for the valve device 1 or 1", 1"' or 1"" to be fastened to the vehicle frame without the need to provide different adapters or other holding apparatuses for this purpose. Even if the housing 8 or the housing block 10 is selected from a set of substantially identical housings or housing blocks with different pressure medium ducts, the mechanical interfaces are preferably identical, such that the valve device 1 or 1", 1' or 1"" can be fastened to the vehicle frame independently of the respectively selected housing 8.

Figure 7:
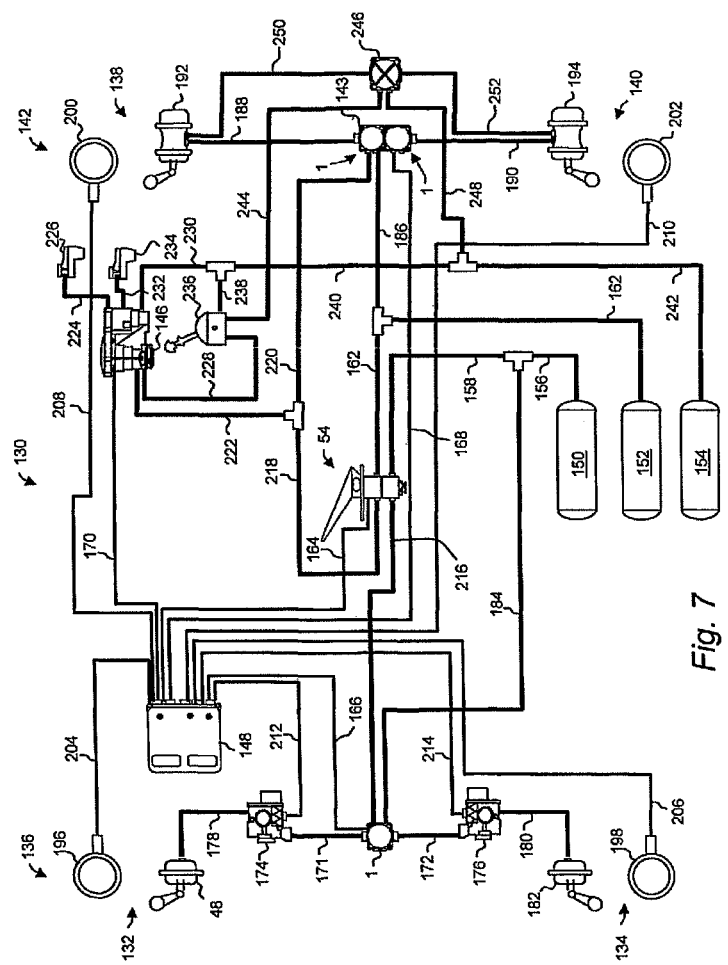
FIG. 7 is a circuit diagram of a brake system having the valve device according to the embodiment depicted in FIG. 1.

FIG. 7 shows a brake system 130 according to an exemplary embodiment of the invention having the valve device 1 of FIG. 1. The valve device 1 has the insert 2, such that the brake system 130 is designed as an EBS brake system or as an electronically regulated brake system, wherein the brake pressure is electropneumatically modulated in accordance with a deceleration demand signal.

The valve device 1 is thus formed as a 1-channel axle modulator and is provided for actuating brakes 132 and 134 on a front axle 136 of a vehicle that has the brake system 130. Further valve devices 1 are provided as wheel modulators in each case for a brake 138 and 140, respectively, on a rear axle 142 of the vehicle, and are combined in a 2-channel axle modulator 143. Furthermore, the brake system 130 has a brake actuating device 54 with a brake transducer, has a trailer control valve device 146, and has a device for control 148 formed as a control unit. The device for control 148 performs central control functions of the electronic brake system, such that it simultaneously forms a central controller of the electronic brake system.

The brake system 130 is constructed with three brake circuits that are fed from three compressed-air reservoir vessels 150, 152 and 154 and that, in turn, receive compressed air from at least one compressor (not illustrated), preferably after treatment in a compressed-air treatment device, and preferably via a four-circuit protection valve. It is primarily possible for the brakes 132 and 134 at the front axle 136 to be actuated by means of the first brake circuit and for the brakes 138 and 140 at the rear axle 142 of the vehicle, and brakes (not illustrated) of an attached trailer, to be actuated by means of the second brake circuit. A third brake circuit, which is fed from the compressed-air reservoir vessel 154, is provided for operating, in particular releasing, a parking brake.

Compressed air from the compressed-air reservoir vessels 150 and 152 is provided to the brake pedal device 54 via compressed-air lines 156 and 158 and also 160 and 162, respectively. In response to an actuation of the brake pedal of the brake pedal device 54, the brake pedal device 54 or the brake transducer generates an electrical brake demand signal that is transmitted via an electrical interface to an electrical line 164 and via the electrical line 164 and via an electrical interface to the device for control 148. Furthermore, the brake actuating device 54 directly modulates a redundancy pressure for the two brake circuits and provides the redundancy pressure via two of its pneumatic interfaces.

The control device 148 is electrically connected via electrical lines 166, 168 and 170, respectively, to the valve devices and modulators 1 and to the trailer control valve 146. The control device 148 can thus perform control functions and, in conjunction with sensors, perform regulating functions for those components of the brake system 130 that it actuates and/or for the valve device 1 and for the trailer control valve device 146.

In response to the braking demand signal, the control device 148 actuates the valve devices 1 such that the valve devices 1 modulate a brake pressure calculated and/or selected by the control device 148 according to the braking demand signal, if appropriate, as a function of further parameters. Pressure sensors (not illustrated) in the valve device 1 measure the modulated brake pressure, transmit the measurement results to the control device 148 via the electrical line 166 and 168, respectively, such that feedback is provided and the brake pressure can be regulated by the control device 148. Electronics for modulating and/or regulating the brake pressure are thus provided in the control device 148. The valve device 1 therefore need not have any control electronics or regulating electronics. It is however alternatively also possible for some or all of the electronics for regulating the brake pressure to be arranged on the valve device 1.

The brake pressure modulated by the valve device 1 or the 1-channel axle modulator 1 at the front axle 136 is provided via a compressed-air line 171 and 172, respectively, firstly to an ABS valve 174 and 176, respectively, for an anti-lock brake function, and subsequently via a compressed-air line 178 and 180, respectively, to the brake cylinder 48 and to a brake cylinder 182, or to a diaphragm part of the brake cylinder 48 and 182, respectively. The brakes 132 and 134 can be actuated by means of the brake cylinders 48 and 182. The compressed air for this purpose is provided to the valve device 1 at the front axle 136 of the vehicle from the first brake circuit via a compressed-air line 184.

By contrast, a compressed-air line 186 supplies compressed air from the second brake circuit to the valve devices 1 or the 2-channel axle modulator 143 at the rear axle 142 of the vehicle. The brake pressure modulated by the valve devices 1 at the rear axle 142 of the vehicle analogously to the modulation of the brake pressure medium by the valve device 1 at the front axle 136 is provided via a compressed-air line 188 and 190, respectively, to a diaphragm part of a combined spring brake cylinder 192 and 194, respectively.

The brake system 130 furthermore provides functions of an anti-lock system, traction control and electronic stability control. Rotational speed information of the individual wheels of the vehicle during driving and during the braking process is required for this purpose. The brake system 130 therefore has wheel sensors 196, 198, 200 and 202, which detect wheel rotational speeds of the individual wheels and transmit measurement values or information regarding the detected wheel rotational speeds to the control device 148 via an electrical line 204, 206, 208 and 210, respectively.

The anti-lock function is intended to counteract a locking tendency of the wheels. If a locking tendency of a wheel at the rear axle 142 of the vehicle is identified, the valve device 1 assigned to the wheel is therefore actuated via the electrical line 168 in order to release the brake 138 or 140, respectively, or in order to ventilate the diaphragm part of the combined spring brake cylinder 192 or 194, respectively, via the compressed-air line 188 or 190, respectively, or in order to lower the pneumatic pressure in the respective diaphragm part. By contrast, at the front axle, to release the brake 132 or 134 in the event of a blocking tendency being identified, the ABS valve 174 or 176, respectively, is actuated by the control device 148 via an electrical line 212 or 214, respectively. In response to this, the ABS valve 174 or 176, respectively, ventilates the compressed-air line 178 or 180, respectively, or at least increases the pressure prevailing therein no further.

It is also the case if an impending or actual loss of stability or skid tendency of the vehicle is detected by means of the electronic stability function that the ABS valves 174 and 176 and the valve devices 1 at the rear axle 142 of the vehicle can be actuated in a targeted manner in order to influence the pressure in the compressed-air lines 178, 180, 188 and 190 or brake individual wheels in a targeted manner, as described for the ABS function.

It is likewise possible for the electronic stability function, and in addition to the traction control, for the pressure in the compressed-air lines 178, 180, 188 and 190 to be increased in a targeted manner. In the case of the traction control, the control device 148 identifies slip of the wheels from the detected wheel rotational speeds and if appropriate from further data, and thus actuates the valve devices 1 in order to brake the wheels to counteract the slip or prevent spinning of the wheels. Here, at the rear axle 142, it is possible for the two wheels to be braked independently of one another. By contrast, at the front axle 136, the 1-channel axle modulator or the valve device 1 is responsible for braking the wheels. The brakes 132 and 134 at the wheels of the front axle 136 may also be acted on with different brake pressures owing to the ABS valves 174 and 176. In this exemplary embodiment, two valve devices 1 as wheel modulators are provided together to form the 2-channel axle modulator at the rear axle 142, but only one valve device 1 is provided, as the 1-channel axle modulator, together with the two ABS valves 174 and 176 at the front axle 136 of the vehicle.

In an alternative exemplary embodiment, however, it is also possible for two valve devices 1 formed as wheel modulators, or a 2-channel axle modulator, to be provided at the front axle instead of the valve device 1, which is used as a 1-channel axle modulator, with the two ABS valves 174, 176.

For the pneumatic modulation of the brake pressure in the redundancy situation, the redundancy pressure modulated by means of the brake actuating device 54 in the first brake circuit is conducted to the valve device 1 at the front axle 136 via a compressed-air line 216. The valve devices 1 at the rear axle 142 analogously receive the modulated redundancy pressure from the second brake circuits via compressed-air lines 218 and 220. In the case of an electrical failure or in the event of an electronics failure, the valve devices 1 modulate the brake pressure in the compressed-air lines 178, 180, 188 and 190 purely pneumatically in accordance with the respective redundancy pressure in the first and second brake circuit respectively, such that the vehicle with the brake system 130 can be braked pneumatically.

The brake system 130 furthermore actuates brakes on a trailer if appropriate. Via a compressed-air line 222, the redundancy pressure from the second brake circuit is connected via a pneumatic interface to the trailer control valve device 146. Via another pneumatic interface, a further compressed-air line 224 is connected to the trailer control valve device 146, which provides the redundancy pressure to a compressed-air port 226, which can be connected to pneumatic systems of the trailer. Compressed-air lines 228, 230 and 232 are connected via further pneumatic interfaces of the trailer control valve 146. A modulated reservoir air pressure can be drawn via the compressed-air line 228, and a reservoir air pressure can be drawn directly via the compressed-air line 230, from the third brake circuit and provided via the compressed-air line 232 to a compressed-air port 234 for connecting to compressed-air systems of the trailer. Here, the compressed air with the modulated air pressure is drawn via a parking brake actuating device 236, which in turn draws the reservoir air pressure from the third brake circuit via compressed-air lines 238, 240 and 242. Electrical actuation and monitoring of the trailer control valve 146 takes place via the electrical line 170.

A parking brake function of the brake system 130 can be controlled by means of the parking brake actuating device 236. The parking brake function can be activated and deactivated by the parking brake actuating device 236 separately for the vehicle and for the trailer, which is possibly coupled to the vehicle. The supply of compressed air takes place from the third brake circuit. To engage or release the parking brake function, spring store parts of the spring brake cylinders 192 and 194 are aerated or ventilated, respectively. For this purpose, the parking brake actuating device 236 provides the modulated parking brake pressure via a compressed-air line 244 to a relay valve 246, which boosts the air pressure with compressed air drawn via a compressed-air line 248 and, in order to release the parking brake, provides the air pressure to spring store parts of the combined spring brake cylinders 192 and 194 via compressed-air lines 250 and 252.

All of the features specified in the above description and in the claims may be used both individually and also in any desired combination. The disclosure of the inventive embodiments is thus not restricted to the described or claimed combinations of features. Rather, all combinations of features should be regarded as being disclosed.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be the to fall therebetween.

What is claimed is:

1. A valve system adaptable for brake control of different pressure-medium-operated vehicle brake systems, the valve system comprising:
    a set of a plurality of different inserts; and
    a valve device configured to receive an insert selected from the set of the plurality of different inserts, the valve device including:
        a housing having a housing block and a housing cover, the housing block having a plurality of pressure medium ducts, the housing cover having at least one pressure medium bore, the housing block being mountable to the housing cover in one direction and configured to receive the selected insert in a different direction; and
        a relay valve configured to increase a pressure medium flow rate of air pressure present at at least one of the plurality of pressure medium ducts, at least two pressure medium ducts of the plurality of pressure medium ducts being configured to pneumatically connect to a first pressure medium bore of the at least one pressure medium bore and to a pneumatic port of the selected insert to define a pressure medium path,
    wherein each insert of the set of the plurality of different inserts provides a different pressure medium path when received by the valve device.

2. The valve system as claimed in claim 1, wherein at least one of the plurality of pressure medium ducts is assigned a function from a group of functions consisting of (i) aeration, (ii) ventilation, (iii) conduction of control pressure or redundancy pressure, (iv) conduction of brake pressure, and (v) not used, depending on the selected insert received by the valve device.

3. The valve system as claimed in claim 1, wherein the at least on pressure medium bore further comprises a second pressure medium bore, and
    wherein operability of the second pressure medium bore is based on the selected insert received by the valve device.

4. The valve system as claimed in claim 1, wherein the plurality of pressure medium ducts comprises a plurality of port ducts leading to ports on the housing,
    wherein the defined pressure medium path comprises at least two of the plurality of port ducts, and
    wherein operability of the port ducts of the pressure medium path is based on the selected insert received by the valve device.

5. The valve system as claimed in claim 1, wherein the relay valve is disposed in the housing block.

6. The valve system as claimed in claim 1, wherein each pressure medium duct of the plurality of pressure medium ducts is dissimilar from other ones of the plurality of pressure medium ducts, and
    wherein the housing block and the housing cover are configured to surround and clamp to the insert.

7. The valve system as claimed in claim 1, wherein each insert of the set of the plurality of different inserts is configured to be inserted in the housing block, comprises at least one of valve cartridges and valve blocks, and includes at least one valve controllable to at least one of open and block a corresponding pressure medium path produced when received by the valve device.

8. The valve system as claimed in claim 7, wherein each of the at least one of valve cartridges and valve blocks has a hardened injection-molded compound or cast compound that at least partially surrounds at least one valve therein.

9. The valve system as claimed in claim 7, wherein the at least one of valve cartridges and valve blocks have (i) at least one of different and identical valves, and (ii) connecting ducts different from one another.

10. The valve system as claimed in claim 7, wherein each of the at least one of valve cartridges and valve blocks has (i) at least one connecting duct, the at least one connecting duct of one of the at least one of valve cartridges and valve blocks being one of dissimilar and identical to the at least one connecting duct of another one of the at least one of valve cartridges and valve blocks, and (ii) at least one valve, the at least once valve of one of the at least one of valve cartridges and valve blocks being one of dissimilar and identical to the at least one valve of another one of the at least one of valve cartridges and valve blocks.

11. The valve system as claimed in claim 1, wherein, depending on the selected insert received by the valve device, the valve device is configured as a device from the group consisting of (i) a relay modulator from an electro-pneumatic parking brake, (ii) a relay modulator for an electronically regulated brake system, (iii) a relay modulator for a pneumatic brake system with at least one of an anti-lock brake system and traction control system, (iv) an electromagnetic relay valve, and (v) a relay valve.

12. The valve system as claimed in claim 4, wherein the ports on the housing are configured to connect to at least one of (i) a compressed-air reservoir, (ii) a vent, (iii) a brake pedal device, and (iv) at least one brake cylinder.

13. The valve system as claimed in claim 1, wherein the housing is formed at least partially from metal, and the plurality of pressure medium ducts is formed at least partially by bored in the housing block.

14. A vehicle brake system, comprising:
pressure-medium-operated brake cylinders, and
the valve system as claimed in claim 1.

15. A vehicle, comprising:
the vehicle brake system as claimed in claim 14.

16. The valve system as claimed in claim 1, wherein the insert is a valve block.

17. A vehicle, comprising:
the valve system as claimed in claim 1.

18. The valve system as claimed in claim 7, wherein the at least one valve is an electromagnetic valve.

19. The valve system as claimed in claim 8, wherein the hardened injection-molded compound or cast compound is a plastic injection-molded compound or cast compound.

20. The valve system as claimed in claim 13, wherein the metal is aluminum.

* * * * *